(12) United States Patent (10) Patent No.: US 10,932,212 B2
Luo (45) Date of Patent: Feb. 23, 2021

(54) PARENT NODE SELECTION METHOD AND NETWORK NODE

(71) Applicant: Huawei Technologies Co., Ltd., Shenzhen (CN)

(72) Inventor: Zhenhui Luo, Dongguan (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 0 days.

(21) Appl. No.: 16/563,251

(22) Filed: Sep. 6, 2019

(65) Prior Publication Data

US 2019/0394737 A1 Dec. 26, 2019

Related U.S. Application Data

(63) Continuation of application No. PCT/CN2018/074472, filed on Jan. 29, 2018.

(30) Foreign Application Priority Data

Mar. 7, 2017 (CN) .......................... 201710132287.7

(51) Int. Cl.
*H04W 56/00* (2009.01)
*H04B 17/318* (2015.01)
(Continued)

(52) U.S. Cl.
CPC ........ *H04W 56/001* (2013.01); *H04B 17/318* (2015.01); *H04W 40/24* (2013.01); *H04W 48/18* (2013.01); *H04W 84/18* (2013.01)

(58) Field of Classification Search
CPC ....... H04B 17/318; H04L 45/30; H04L 45/48; H04W 40/12; H04W 40/24; H04W 40/32;
(Continued)

(56) References Cited

U.S. PATENT DOCUMENTS

2011/0116389 A1* 5/2011 Tao .......................... H04L 45/18
370/252
2011/0228788 A1 9/2011 Thubert et al.
(Continued)

FOREIGN PATENT DOCUMENTS

CN 101197748 A 6/2008
CN 102056263 A 5/2011
(Continued)

OTHER PUBLICATIONS

Machine Translation and Abstract of Chinese Publication No. CN102651863, Aug. 29, 2012, 27 pages.
(Continued)

*Primary Examiner* — Khaled M Kassim
(74) *Attorney, Agent, or Firm* — Conley Rose, P.C.

(57) ABSTRACT

A parent node selection method includes obtaining, by a network node, an identifier of each of candidate parent nodes, a quantity of subnodes already connected to each candidate parent node and a rank of each candidate parent node; obtaining a candidate rank of the network node that corresponds to each candidate parent node; determining, according to a first preset rule, a first candidate parent node set from the candidate parent nodes based on the identifier of each candidate parent node and the candidate rank of the network node that corresponds to each candidate parent node; and determining, based on a quantity of subnodes already connected to each candidate parent node in the first candidate parent node set, a candidate parent node that is in the first candidate parent node set and that is already connected to a smallest quantity of subnodes as a target parent node of the network node.

20 Claims, 7 Drawing Sheets

(51) Int. Cl.
*H04W 40/24* (2009.01)
*H04W 48/18* (2009.01)
*H04W 84/18* (2009.01)

(58) Field of Classification Search
CPC ... H04W 48/18; H04W 56/001; H04W 84/10; H04W 84/18; Y02D 30/70
See application file for complete search history.

(56) References Cited

U.S. PATENT DOCUMENTS

| | | | |
|---|---|---|---|
| 2012/0099587 A1* | 4/2012 | Fan | H04W 40/16 370/389 |
| 2013/0028104 A1* | 1/2013 | Hui | H04W 40/125 370/252 |
| 2013/0028143 A1 | 1/2013 | Vasseur et al. | |
| 2015/0023174 A1* | 1/2015 | Dasgupta | H04W 40/248 370/236 |
| 2015/0043384 A1* | 2/2015 | Hui | H04W 40/246 370/255 |
| 2015/0043519 A1* | 2/2015 | Hui | H04B 1/713 370/330 |
| 2015/0109926 A1* | 4/2015 | Jin | H04W 40/22 370/235 |
| 2015/0156738 A1* | 6/2015 | Guo | H04W 40/005 709/236 |
| 2015/0195144 A1* | 7/2015 | Vasseur | G06N 20/00 706/12 |
| 2017/0078170 A1* | 3/2017 | Vasseur | H04L 69/22 |
| 2018/0262401 A1* | 9/2018 | Shah | H04W 40/32 |
| 2018/0278353 A1* | 9/2018 | Tohzaka | H04W 72/0446 |
| 2020/0084690 A1* | 3/2020 | Sakata | H04L 45/20 |

FOREIGN PATENT DOCUMENTS

| | | |
|---|---|---|
| CN | 102651863 A | 8/2012 |
| CN | 102685917 A | 9/2012 |
| CN | 102711211 A | 10/2012 |
| CN | 103220745 A | 7/2013 |
| WO | 2008096912 A1 | 8/2008 |

OTHER PUBLICATIONS

Machine Translation and Abstract of Chinese Publication No. CN102711211, Oct. 3, 2012, 16 pages.
Foreign Communication From a Counterpart Application, Chinese Application No. 201710132287.7, Chinese Office Action dated Dec. 17, 2019, 6 pages.
Machine Translation and Abstract of Chinese Publication No. CN101197748, Jun. 11, 2008, 29 pages.
Machine Translation and Abstract of Chinese Publication No. CN102056263, May 11, 2011, 23 pages.
Machine Translation and Abstract of Chinese Publication No. CN102685917, Sep. 19, 2012, 11 pages.
Machine Translation and Abstract of Chinese Publication No. CN103220745, Jul. 24, 2013, 12 pages.
Foreign Communication From a Counterpart Application, PCT Application No. PCT/CN2018/074472, English Translation of International Search Report dated Apr. 27, 2018, 2 pages.
Foreign Communication From a Counterpart Application, PCT Application No. PCT/CN2018/074472, English Translation of Written Opinion dated Apr. 27, 2018, 4 pages.
Lee, T., et al., "A Synergistic Architecture for RPL over BLE," XP032993988, 13th Annual IEEE International Conference on Sensing, Communication, and Networking (SECON), 2016, 9 pages.
Foreign Communication From a Counterpart Application, European Application No. 18764036.2, Extended European Search Report dated Dec. 6, 2019, 5 pages.

* cited by examiner

PARENT NODE SELECTION METHOD AND NETWORK NODE

CROSS-REFERENCE TO RELATED APPLICATIONS

This application is a continuation application of International Patent Application No. PCT/CN2018/074472 filed on Jan. 29, 2018, which claims priority to Chinese Patent Application No. 201710132287.7 filed on Mar. 7, 2017. The disclosures of the aforementioned applications are hereby incorporated by reference in their entireties.

TECHNICAL FIELD

This application relates to the field of communications technologies, and in particular, to a parent node selection method and a network node.

BACKGROUND

Internet Protocol version 6 (IPv6) over Low Power Wireless Personal Area Networks (6LoWPANs) is an IPv6-based low-rate wireless personal area network standard. The 6LoWPAN is an emerging technology of the Internet of Things, and mainly allows IPv6 to be applied to Internet of Things wireless technologies, such as radio frequency (RF).

Same as ZIGBEE, in the 6LoWPAN, a media access control (MAC) address also uses the Institute of Electrical and Electronics Engineers (IEEE) 802.15.4 standard, and a formed network is also a wireless mesh network, as shown in FIG. 1. It can be learned from FIG. 1 that in a wireless mesh network, a border router (BR) may communicate with a plurality of level-1 nodes (node), and each level-1 node may communicate with a plurality of level-2 nodes, and so on. For example, the level-1 nodes may be N1, N2, and N3, and the level-2 nodes may be N4, N5, . . . , and the like. A level-(n−1) node connected to a level-n node is referred to as a parent node of the level-n node. For example, in FIG. 1, a parent node of N4 is N1.

At present, in a 6LoWPAN wireless mesh network, a node usually selects a parent node based on a destination-oriented directed acyclic graph (DODAG) information object (DIO) broadcast of a candidate parent node. Further, the DIO broadcast includes a rank of the candidate parent node. The Internet Engineering Task Force (IETF) RFC6550 standard defines that a rank of a node is a position of the node relative to a root node in the DODAG, that is, a transmission path from the node to the root node in the DODAG. In the wireless mesh network, the root node in the DODAG is the BR in FIG. 1. Therefore, in the wireless mesh network, the rank of the node is actually a transmission path from the node to the BR. After a node obtains a rank of a parent node, the node usually calculates a total transmission path from the node to the BR through the parent node based on $RANK=ETX\_S+ETX\_F$, where $ETX\_F$ indicates the rank of the parent node, and $ETX\_S$ indicates a current actual transmission path from the node to the parent node of the node, that is, a current actual expected transmission count (ETX) at the node. A current actual ETX at a node is usually determined based on a previous temporary ETX at the node, a current temporary ETX, and a related proportional allocation factor. For example, $ETX\_S$ is calculated based on $ETX\_S=ETX\_Old*90\%+ETX\_New*10\%$, where $ETX\_S$ represents a current actual ETX at a node, $ETX\_Old$ represents a previous temporary ETX at the node, and $ETX\_New$ represents a current temporary ETX at the node. $ETX\_New=RsCnt\_New*R$, where $RsCnt\_New$ represents a current retransmission count at the node, R is a preset path coefficient, and a default value of $ETX\_New$ is usually set to R. After a node obtains a total transmission path that is from the node to the BR through a parent node, parent node switching is usually performed based on a switching condition $RANK\_Old-RANK\_New>R$, where $RANK\_New$ represents a total transmission path, re-calculated after a node receives a DIO broadcast of a candidate parent node of the node, from the node to the BR through the candidate parent node, and $RANK\_Old$ represents a total transmission path from the node to the BR through a connected parent node.

However, in this parent node selection manner, a large quantity of nodes may select a same parent node. For example, in FIG. 2, N3 is a newly added node. A default value of $ETX\_New$ is R, and therefore a transmission path passing through the node is relatively good. When the node externally broadcasts a DIO, all nodes receiving the DIO broadcast from the node re-selects the node N3 as a parent node, causing a thundering herd effect. Because a large quantity of subnodes is connected to the parent node N3, the node N3 becomes a forwarding convergence. This causes a higher transmission failure rate and a larger quantity of retransmissions, and further causes a dramatic increase in a rank of the node N3. According to the foregoing parent node switching condition, this will trigger all the nodes connected to the parent node, N3, to perform parent-node re-selection and switching. For example, as shown in FIG. 3, all network nodes connected to N3 performs parent-node switching to N1 and N2. Repeated switching causes frequent parent-node switching, thereby affecting stability of the wireless mesh network.

Therefore, how to select a parent node to enable the 6LoWPAN to rapidly and stably form a balanced wireless mesh network is an urgent problem that needs to be resolved currently.

SUMMARY

This application provides a parent node selection method and a network node such that 6LoWPAN can rapidly and stably form a balanced wireless mesh network.

To achieve the foregoing objective, this application provides the following technical solutions.

According to a first aspect, a parent node selection method is provided and is applied to a wireless mesh network. The method includes obtaining, by a network node, an identifier (ID) of each of a plurality of candidate parent nodes, a quantity of subnodes already connected to each candidate parent node, and a rank of each candidate parent node, where the rank of the candidate parent node is a total transmission path from the candidate parent node to a BR of the wireless mesh network and is obtained by the candidate parent node based on a default value of a current temporary ETX at the candidate parent node, the default value of the current temporary ETX at the candidate parent node is greater than R, and R represents a preset path coefficient, obtaining a candidate rank of the network node corresponding to each candidate parent node, where a candidate rank of the network node corresponding to a candidate parent node is a total transmission path from the network node to the BR through the candidate parent node and is obtained based on a rank of the candidate parent node and a current actual ETX at the network node, the current actual ETX at the network node is obtained based on a default value of a current temporary ETX at the network node, and the default value of the current temporary ETX at the network node is greater than R, determining, according to a first preset rule, a first candidate parent node set from the plurality of candidate parent nodes based on the identifier of each candidate parent node and the candidate rank of the network node corresponding to each candidate parent node, where the first preset rule is that the first candidate parent node set includes a first candidate parent node and a candidate parent node with same communication quality as the first candidate parent node, the first candidate parent node is one of the plurality of candidate parent nodes, and a candidate rank of the network node corresponding to the first candidate parent node is smallest, and determining, based on a quantity of subnodes already connected to each candidate parent node in the first candidate parent node set, a candidate parent node that is in the first candidate parent node set and that is already connected to a smallest quantity of subnodes as a target parent node of the network node. That is, in this solution, the rank of each candidate parent node is obtained by the candidate parent node based on that the default value of the current temporary ETX at the candidate parent node is greater than R, and the current actual ETX at the network node is obtained by the network node based on that the default value of the current temporary ETX at the network node is greater than R, where R represents the preset path coefficient. In addition, the network node first determines the first candidate parent node set from the plurality of candidate parent nodes based on the candidate rank of the network node corresponding to each candidate parent node, and then selects the target parent node from the first candidate parent node set based on the quantity of subnodes already connected to each candidate parent node in the first candidate parent node set. On one hand, when determining the first candidate parent node set, a smaller rank indicates better communication quality. Therefore, the first candidate parent node set includes the first candidate parent node, the first candidate parent node is one of the plurality of candidate parent nodes, and the candidate rank of the network node corresponding to the first candidate parent node is smallest. In addition, when selecting a parent node, the network node is not expected to perform switching back and forth between parent nodes with same communication quality. Therefore, the first candidate parent node set further includes the parent node with the same communication quality as the first candidate parent node such that the network node can select the target parent node from the first candidate parent node set. In addition, because default values of current temporary ETXs at each candidate parent node and the network node in the mesh network are both greater than R, when a candidate parent node is a newly added node, by properly setting the default values of the current temporary ETXs, the candidate parent node is usually not included in the first candidate parent node set, and therefore will not become the target parent node of the network node. This can avoid a thundering herd effect of 6LoWPAN. On the other hand, when selecting the target parent node from the first candidate parent node set, the candidate parent node that is in the first candidate parent node set and that is already connected to a smallest quantity of subnodes is determined as the target parent node of the network node. That is, balance factors of a 6LoWPAN wireless mesh network are fully considered, and a possibility that parent node aging and parent node switching are easily caused because the parent node is connected to an excessively large quantity of network nodes is reduced. In this case, the 6LoWPAN can rapidly and stably form a balanced wireless mesh network. This is further helpful for improving networking efficiency and communication stability of the 6LoWPAN wireless mesh network, and indirectly increases an access capacity of the wireless mesh network.

Optionally, that default values of current temporary ETXs at each candidate parent node and the network node are greater than R includes that the default values of the current temporary ETX at each candidate parent node and the network node each is a product of R and a half of a maximum quantity of network-supported hops, where the maximum quantity of network-supported hops is greater than 2. In this case, when a candidate parent node is a newly added node, the candidate parent node is usually not included in the first candidate parent node set, and therefore will not become the target parent node of the network node. This can avoid a thundering herd effect of 6LoWPAN.

With reference to the first aspect, in a first possible implementation of the first aspect, the candidate parent node with same communication quality as the first candidate parent node is a candidate parent node corresponding to a candidate rank of the network node with a difference from a target rank being not greater than R, and the target rank is a candidate rank of the network node corresponding to the first candidate parent node. In this case, when the network node is currently connected to a parent node, if a candidate rank of the network node corresponding to the parent node is different from the target rank by greater than R, that is, a parent node switching condition is met, the network node necessarily performs parent-node switching. This is because according to the first preset condition, the parent node currently connected to the network node does not belong to the first candidate parent node set, and therefore a possibility that the parent node is selected as the target parent node does not exist.

With reference to the first aspect or the first possible implementation of the first aspect, in a second possible implementation of the first aspect, the method further includes obtaining a received signal strength indicator (RSSI) of each of the plurality of candidate parent nodes, where determining, based on a quantity of subnodes already connected to each candidate parent node in the first candidate parent node set, a candidate parent node that is in the first candidate parent node set and that is already connected to a smallest quantity of subnodes as a target parent node of the network node includes determining, according to a second preset rule, a second candidate parent node set based on the RSSI of each candidate parent node in the first candidate parent node set, where the second preset rule is that the second candidate parent node set includes a second candidate parent node and a candidate parent node with same signal strength as the second candidate parent node, and the second candidate parent node is a candidate parent node with a largest RSSI in the first candidate parent node set, and determining, based on a quantity of subnodes already connected to each candidate parent node in the second candidate parent node set, a candidate parent node that is in the second candidate parent node set and that is already connected to a smallest quantity of subnodes. That is, in this solution, the rank of each candidate parent node is obtained by the candidate parent node based on that the default value of the current temporary ETX at each candidate parent node is greater than R, and the current actual ETX at the network node is obtained by the network node based on that the default value of the current temporary ETX at the network node is greater than R, where R represents the preset path coefficient. In addition, the network node first determines the first candidate parent node set from the plurality of candidate parent nodes based on the candidate rank of the network node corresponding to each candidate parent node, then determines the second candidate parent node set from the first candidate parent node set based on the RSSI of the candidate parent node, and finally selects the target parent node from the second candidate parent node set based on the quantity of subnodes already connected to the candidate parent node. On one hand, when determining the first candidate parent node set, a smaller rank indicates better communication quality. Therefore, the first candidate parent node set includes the first candidate parent node, the first candidate parent node is one of the plurality of candidate parent nodes, and the candidate rank of the network node corresponding to the first candidate parent node is smallest. In addition, when selecting a parent node, the network node is not expected to perform switching back and forth between parent nodes with same communication quality. Therefore, the first candidate parent node set further includes the parent node with the same communication quality as the first candidate parent node such that the network node can select the target parent node from the first candidate parent node set. In addition, because default values of current temporary ETXs at each candidate parent node and the network node in the mesh network are both greater than R, when a candidate parent node is a newly added node, by properly setting the default values of the current temporary ETXs, the candidate parent node is usually not included in the first candidate parent node set, and therefore will not become the target parent node of the network node. This can avoid a thundering herd effect of 6LoWPAN. On the other hand, when selecting the target parent node from the second candidate parent node set, the candidate parent node that is in the second candidate parent node set and that is already connected to a smallest quantity of subnodes is determined as the target parent node of the network node, and the second candidate parent node set includes a candidate parent node with a relatively good RSSI in the first candidate parent node set. That is, balance factors of a 6LoWPAN wireless mesh network are further fully considered, and not only a possibility that parent node aging and parent node switching are easily caused because the parent node is connected to an excessively large quantity of network nodes is reduced, but also communication quality of the wireless mesh network is not reduced. In this case, the 6LoWPAN can rapidly and stably form a more balanced wireless mesh network. This is further helpful for improving networking efficiency and communication stability of the 6LoWPAN wireless mesh network, and further increases an access capacity of the wireless mesh network.

With reference to the second possible implementation of the first aspect, in a third implementation of the first aspect, the candidate parent node with same signal strength as the second candidate parent node includes a candidate parent node whose RSSI is different from an RSSI of the candidate parent node with a largest RSSI by less than a second threshold.

With reference to any one of the first aspect and the first to the third possible implementations of the first aspect, in a fourth possible implementation of the first aspect, obtaining, by a network node, an identifier of each of a plurality of candidate parent nodes, a quantity of subnodes already connected to each candidate parent node, and a rank of each candidate parent node includes receiving, by the network node, an IPv6 Routing Protocol for Low-Power and Lossy Networks (RPL) DIO packet from each of the plurality of candidate parent nodes, where the RPL DIO packet from each candidate parent node includes the identifier of each candidate parent node, the quantity of subnodes already connected to each candidate parent node, and the rank of each candidate parent node. In this solution, the network node can obtain the identifier of each of the plurality candidate parent nodes, the quantity of subnodes already connected to each candidate parent node, and the rank of each candidate parent node.

With reference to any one of the second possible implementation of the first aspect to the fourth possible implementation of the first aspect, in a fifth possible implementation of the first aspect, obtaining, by the network node, an RSSI of each candidate parent node includes receiving the RPL DIO packet from each of the plurality of candidate parent nodes, where the RPL DIO packet from each candidate parent node includes the RSSI of each candidate parent node. In this solution, the network node can obtain the RSSI of each candidate parent node.

With reference to any one of the first aspect and the first to the fifth possible implementation of the first aspect, in a sixth possible implementation of the first aspect, the method further includes sending an RPL DIO packet from the network node to a candidate subnode of the network node, where the RPL DIO packet from the network node includes an identifier of the network node, a quantity of subnodes already connected to the network node, and a rank of the network node. In this way, after receiving the RPL DIO packet sent by the network node, the candidate subnode of the network node can select a parent node based on the identifier of the network node, the quantity of subnodes already connected to the network node, and the rank of the network node.

With reference to the sixth possible implementation of the first aspect, in a seventh possible implementation of the first aspect, the RPL DIO packet from the network node further includes an RSSI of the network node. In this way, after receiving the RPL DIO packet sent by the network node, the candidate subnode of the network node can select a parent node based on the identifier of the network node, the quantity of subnodes already connected to the network node, the rank of the network node, and the RSSI of the network node.

According to a second aspect, a network node is provided. The network node has functions of implementing behaviors of the network node in the foregoing method. The function may be implemented using hardware or by executing corresponding software by hardware. The hardware or software includes one or more modules corresponding to the functions.

According to a third aspect, a network node is provided, including a processor and a communications interface. The processor is connected to the communications interface using a bus, and the processor is configured to implement the parent node selection method according to any one of the first aspect and the possible implementations of the first aspect.

Optionally, the network node further includes a memory, and the memory is configured to store a computer program instruction. The processor is connected to the memory using the bus, and the processor executes the program instruction stored in the memory such that the network node performs the parent node selection method according to any one of the first aspect and the possible implementations of the first aspect.

According to a fourth aspect, a computer readable storage medium is provided. The computer readable storage medium is configured to store a computer program instruction used by the foregoing network node, and when the instruction runs on a computer, the computer can perform the parent node selection method in any one of the possible implementations of the first aspect.

According to a fifth aspect, a computer program product including an instruction is provided, where when the computer program product runs on a computer, the computer can perform the parent node selection method in any one of the possible implementations of the first aspect.

According to a sixth aspect, a parent node selection system is provided and is applied to a wireless mesh network, where the parent node selection system includes a network node and a plurality of candidate parent nodes, where each candidate parent node is configured to send, to the network node, an RPL DIO packet, where the RPL DIO packet includes an identifier of the candidate parent node, a quantity of subnodes already connected to the candidate parent node, and a rank of the candidate parent node, where the rank of the candidate parent node is a total transmission path from the candidate parent node to a BR of the wireless mesh network and is obtained by the candidate parent node based on a default value of a current temporary ETX at the candidate parent node, the default value of the current temporary ETX at the candidate parent node is greater than R, and R represents a preset path coefficient, the network node is configured to receive the RPL DIO packet from each candidate parent node, obtain an identifier of each candidate parent node, a quantity of subnodes already connected to each candidate parent node, and a rank of each candidate parent node, and obtain a candidate rank of the network node corresponding to each candidate parent node, where a candidate rank of the network node corresponding to a candidate parent node is a total transmission path from the network node to the BR through the candidate parent node and is obtained based on a rank of the candidate parent node and a current actual ETX at the network node, the current actual ETX at the network node is obtained based on a default value of a current temporary ETX at the network node, and the default value of the current temporary ETX at the network node is greater than R, the network node is further configured to determine, according to a first preset rule, a first candidate parent node set from the plurality of candidate parent nodes based on the identifier of each candidate parent node and the candidate rank of the network node corresponding to each candidate parent node, where the first preset rule is that the first candidate parent node set includes a first candidate parent node and a candidate parent node with same communication quality as the first candidate parent node, the first candidate parent node is one of the plurality of candidate parent nodes, and a candidate rank of the network node corresponding to the first candidate parent node is smallest, and the network node is further configured to determine, based on a quantity of subnodes already connected to each candidate parent node in the first candidate parent node set, a candidate parent node that is in the first candidate parent node set and that is already connected to a smallest quantity of subnodes as a target parent node of the network node.

With reference to the sixth aspect, in a first possible implementation of the sixth aspect, the RPL DIO packet from each candidate parent node further includes an RSSI of the candidate parent node, and that the network node is further configured to determine, based on a quantity of subnodes already connected to each candidate parent node in the first candidate parent node set, a candidate parent node that is in the first candidate parent node set and that is already connected to a smallest quantity of subnodes as a target parent node of the network node includes determining, according to a second preset rule, a second candidate parent node set based on the RSSI of each candidate parent node in the first candidate parent node set, where the second preset rule is that the second candidate parent node set includes a second candidate parent node and a candidate parent node with same signal strength as the second candidate parent node, and the second candidate parent node is a candidate parent node with a largest RSSI in the first candidate parent node set, and determining, based on a quantity of subnodes already connected to each candidate parent node in the second candidate parent node set, a candidate parent node that is in the second candidate parent node set and that is already connected to a smallest quantity of subnodes as the target parent node of the network node.

For a technical effect brought by any design manner in the second aspect to the sixth aspect, refer to technical effects brought by different design manners in the first aspect. Details are not described herein again.

DESCRIPTION OF EMBODIMENTS

The following describes the technical solutions in the embodiments of the present disclosure with reference to accompanying drawings in the embodiments of the present disclosure. In descriptions of this application, unless otherwise specified, "/" represents a meaning of "or". For example, A/B may represent A or B. The term "and/or" in this specification describes only an association relationship for describing associated objects and represents that three relationships may exist. For example, A and/or B may represent the three cases, only A exists, both A and B exist, and only B exists. In addition, in the descriptions of this application, "a plurality of" means two or more than two.

Figures 5, 6:
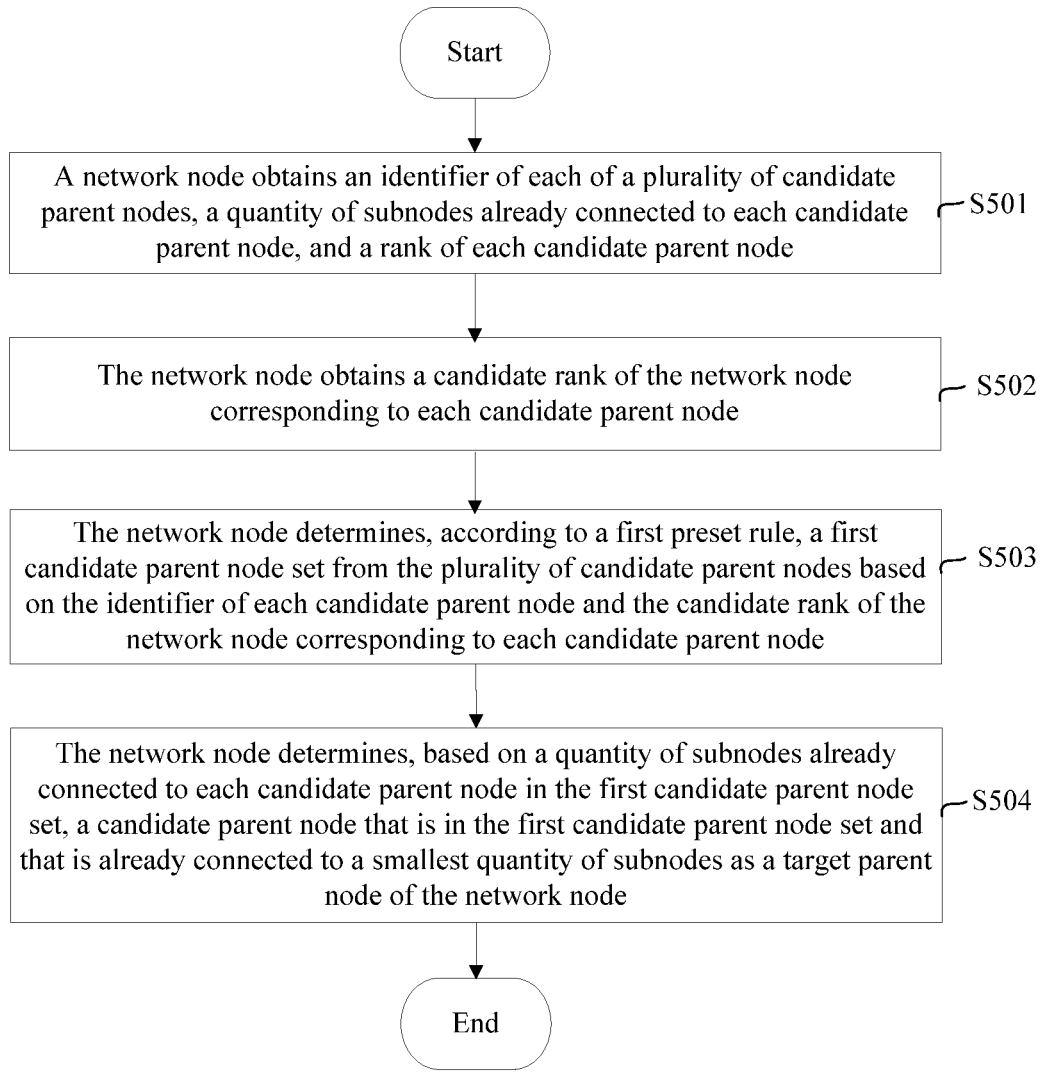
FIG. 5 is a schematic flowchart 1 of a parent node selection method according to an embodiment of the present disclosure.
FIG. 6 is a schematic diagram 1 of a format of an RPL DIO packet according to an embodiment of the present disclosure.

FIG. 5 shows a parent node selection method according to an embodiment of the present disclosure. The method is applied to a wireless mesh network and includes the following steps.

Step S501: A network node obtains an identifier of each of a plurality of candidate parent nodes, a quantity of subnodes already connected to each candidate parent node, and a rank of each candidate parent node.

The rank of the candidate parent node is a total transmission path from the candidate parent node to a BR of the wireless mesh network and is obtained by the candidate parent node based on a default value of a current temporary ETX at the candidate parent node, the default value of the current temporary ETX at the candidate parent node is greater than R, and R represents a preset path coefficient. Further, for a manner of calculating the rank of each candidate parent node, refer to the background, and details are not described herein again. The transmission path herein is used to represent a capability of transmission from a node to the BR.

The identifier of the candidate parent node may be, for example, a MAC address or number of the candidate parent node, and this is not limited in this embodiment of the present disclosure.

Figure 1:
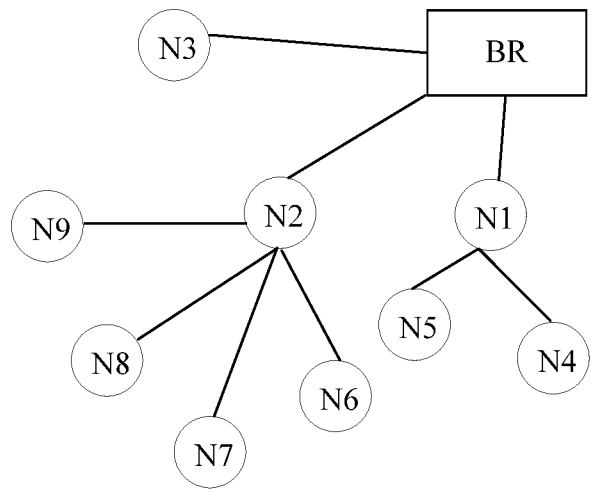
FIG. 1 is a schematic diagram of a network topology of a wireless mesh network.
Figure 2:
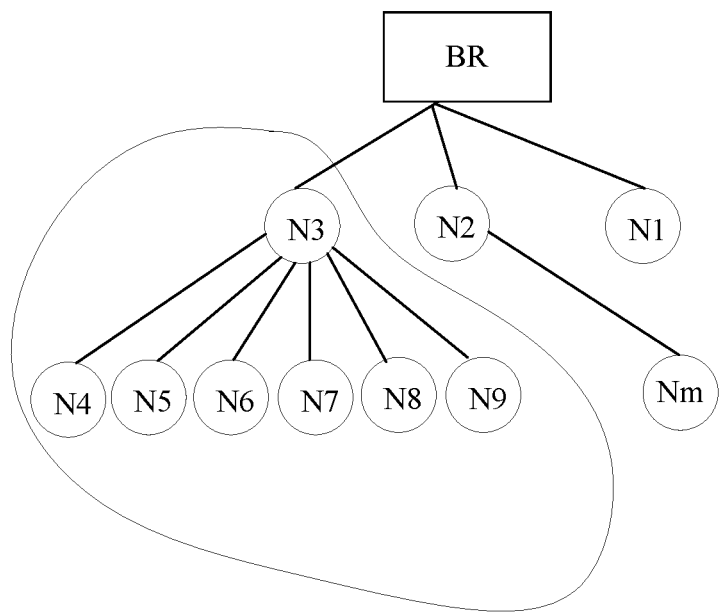
FIG. 2 is a schematic diagram 1 of a network topology of an unbalanced wireless mesh network obtained based on a parent node selection manner.

In this embodiment of the present disclosure, the BR in the wireless mesh network is used as a first-hop parent node, a lower-level node of the BR is used as a first-hop subnode and a second-hop parent node, and so on. That is, in the wireless mesh network in this embodiment of the present disclosure, a node different from the BR may be used not only as a parent node of a lower-level node of the node, but also as a subnode of an upper-level node of the node. For example, in FIG. 1, a first-hop parent node is a BR, whereas lower-level nodes of the BR, N1, N2, and N3, may be considered as second-hop parent nodes, and may be also considered as first-hop subnodes. If N1, N2, and N3 are considered as first-hop subnodes, N1, N2, and N3 are used as subnodes of the BR, if N1, N2, and N3 are considered as second-hop parent nodes, subnodes of the parent node N1 are N4 and N5, and subnodes of the parent node N2 are N6, N7, N8, and N9. Description is provided herein, and details are not described in the following again.

Step S502: The network node obtains a candidate rank of the network node corresponding to each candidate parent node.

A candidate rank of the network node corresponding to a candidate parent node is a total transmission path from the network node to the BR through the candidate parent node. For example, assuming that in FIG. 1, N3 is a candidate parent node of N8, a candidate rank of N8 corresponding to N3 is actually a total transmission path from N8 to the BR through N3. Further, for a manner of calculating a candidate rank of the network node, refer to the background, and details are not described herein again.

A candidate rank of the network node corresponding to a candidate parent node is obtained based on a rank of the candidate parent node and a current actual ETX at the network node, the current actual ETX at the network node is obtained based on a default value of a current temporary ETX at the network node, and the default value of the current temporary ETX at the network node is greater than R. Further, for a manner of calculating the current actual ETX at the network node, refer to the background, and details are not described herein again.

Step S503: The network node determines, according to a first preset rule, a first candidate parent node set from the plurality of candidate parent nodes based on the identifier of each candidate parent node and the candidate rank of the network node corresponding to each candidate parent node.

The first preset rule is that the first candidate parent node set includes a first candidate parent node and a candidate parent node with same communication quality as the first candidate parent node, the first candidate parent node is one of the plurality of candidate parent nodes, and a candidate rank of the network node corresponding to the first candidate parent node is smallest.

A smaller rank indicates better communication quality. Therefore, the first candidate parent node set includes the first candidate parent node, the first candidate parent node is one of the plurality of candidate parent nodes, and the candidate rank of the network node corresponding to the first candidate parent node is smallest. In addition, when selecting a parent node, the network node is not expected to perform switching back and forth between parent nodes with same communication quality. Therefore, the first candidate parent node set further includes the candidate parent node with the same communication quality as the first candidate parent node such that the network node can select a target parent node from the first candidate parent node set.

Step S504: The network node determines, based on a quantity of subnodes already connected to each candidate parent node in the first candidate parent node set, a candidate parent node that is in the first candidate parent node set and that is already connected to a smallest quantity of subnodes as a target parent node of the network node.

It should be noted that in this embodiment of the present disclosure, if there are a plurality of candidate parent nodes that are in the first candidate parent node set and that are already connected to a smallest quantity of subnodes, one candidate parent node may be randomly selected, and this is not further limited in this embodiment of the present disclosure.

Optionally, step S501 may be implemented in the following manner.

The network node receives an RPL DIO packet from each of the plurality of candidate parent nodes, where the RPL DIO packet from each candidate parent node includes the identifier of each candidate parent node, the quantity of subnodes already connected to each candidate parent node, and the rank of each candidate parent node.

In the RPL transmission protocol, a DIO is used by a parent node to periodically broadcast information about the parent node or used by the parent node to respond to DODAG information solicitation (DIS) packet request information of a network node in a unicast mode. This is not limited in this embodiment of the present disclosure. After receiving the RPL DIO packet, the network node determines whether to use the parent node as the target parent node of the network node. In this embodiment of the present disclosure, a format of the RPL DIO packet is shown in FIG. 6, and the RPL DIO packet mainly includes an RPL device ID field, a version number field, a RANK field, a DODAG ID field, a subnode count (designated as SubNC) field, and the like. The RPL device ID field is used to represent the identifier of the parent node, the version number field is used to represent a version number of the RPL DIO packet, the RANK field is used to represent the rank of the parent node, the DODAG ID field is used to identify a DODAG, and the SubNC field is used to represent the quantity of subnodes already connected to the parent node.

It should be noted that in the other approaches RPL DIO packet does not include a SubNC field. That is, the SubNC field is a newly added field in the RPL DIO packet provided in this embodiment of the present disclosure compared with the other approaches RPL DIO packet. Description is provided herein, and details are not described in the following again.

Certainly, the RPL DIO packet may further include another field, for example, a mode of operation (MOP) field, and a destination advertisement trigger sequence number (DTSN) field. This is not limited in this embodiment of the present disclosure.

It should be noted that in this embodiment of the present disclosure, when a parent node is newly connected to a network node, RPL DIO packets need to be resent to other network nodes that have already requested for a DIO in order to update a value of the SubNC field in a timely manner, that is, to update, in a timely manner, a quantity of subnodes already connected to the parent node such that accuracy is ensured for subsequent selecting a parent node by these network nodes that have already requested for the DIO. Description is provided herein, and details are not described in the following again.

Optionally, parent node switching is performed according to an existing parent node switching condition provided in the background: RANK_Old-RANK_New>R. In step S503, the candidate parent node with same communication quality as the first candidate parent node is a candidate parent node corresponding to a candidate rank of the network node with a difference from a target rank being not greater than R, and the target rank is a candidate rank of the network node corresponding to the first candidate parent node. In this case, when the network node is currently connected to a parent node, if a candidate rank of the network node corresponding to the parent node is different from the target rank by greater than R, that is, the parent node switching condition is met, the network node necessarily performs node switching. This is because according to the first preset condition, the parent node currently connected to the network node does not belong to the first candidate parent node set, and therefore a possibility that the parent node is selected as the target parent node does not exist.

Certainly, if parent node switching is performed according to a switching condition RANK_Old-RANK_New>t*R, in this embodiment of the present disclosure, the candidate parent node with same communication quality as the first candidate parent node may further include a candidate parent node corresponding to a candidate rank of the network node with a difference from a target rank being not greater than t*R, and the target rank is a candidate rank of the network node corresponding to the first candidate parent node, and t is a positive rational number, for example, t=0.5. This is not limited in this embodiment of the present disclosure.

Based on the parent node selection method provided in this embodiment of the present disclosure, in this embodiment of the present disclosure, the rank of each candidate parent node is obtained by the candidate parent node based on that the default value of the current temporary ETX at each candidate parent node is greater than R, and the current actual ETX at the network node is obtained by the network node based on that the default value of the current temporary ETX at the network node is greater than R, where R represents the preset path coefficient. In addition, the network node first determines the first candidate parent node set from the plurality of candidate parent nodes based on the candidate rank of the network node corresponding to each candidate parent node, and then selects the target parent node from the first candidate parent node set based on the quantity of subnodes already connected to each candidate parent node in the first candidate parent node set. On one hand, when determining the first candidate parent node set, a smaller rank indicates better communication quality. Therefore, the first candidate parent node set includes the first candidate parent node, the first candidate parent node is one of the plurality of candidate parent nodes, and the candidate rank of the network node corresponding to the first candidate parent node is smallest. In addition, when selecting a parent node, the network node is not expected to perform switching back and forth between parent nodes with same communication quality. Therefore, the first candidate parent node set further includes the parent node with the same communication quality as the first candidate parent node such that the network node can select the target parent node from the first candidate parent node set. In addition, because default values of current temporary ETXs at each candidate parent node and the network node in the mesh network are both greater than R, when a candidate parent node is a newly added node, by properly setting the default values of the current temporary ETXs, the candidate parent node is usually not included in the first candidate parent node set, and therefore will not become the target parent node of the network node. This can avoid a thundering herd effect of 6LoWPAN. On the other hand, when selecting the target parent node from the first candidate parent node set, the candidate parent node that is in the first candidate parent node set and that is already connected to a smallest quantity of subnodes is determined as the target parent node of the network node. That is, balance factors of a 6LoWPAN wireless mesh network are fully considered, and a possibility that parent node aging and parent node switching are easily caused because the parent node is connected to an excessively large quantity of network nodes is reduced. In this case, the 6LoWPAN can rapidly and stably form a balanced wireless mesh network. This is further helpful for improving networking efficiency and communication stability of the 6LoWPAN wireless mesh network, and indirectly increases an access capacity of the wireless mesh network.

The following provides a specific example of parent node selection with reference to the parent node selection method shown in FIG. 5.

Figure 3:
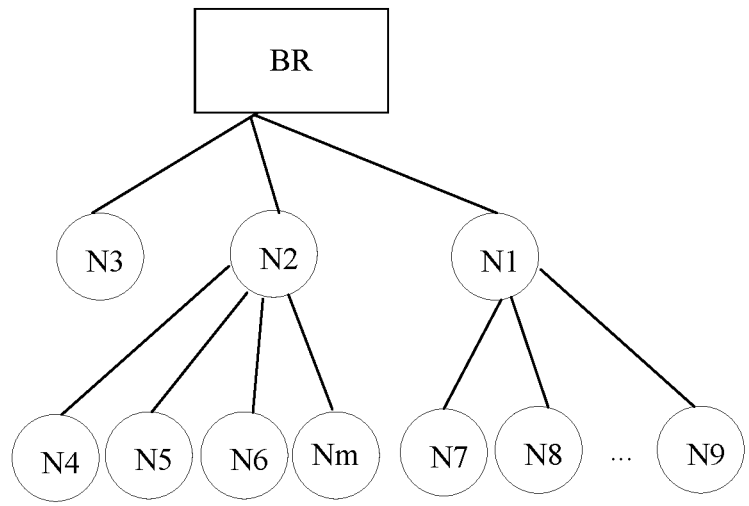
FIG. 3 is a schematic diagram 2 of a network topology of an unbalanced wireless mesh network obtained based on a node selection manner.

For example, it is assumed that the network node in this embodiment of the present disclosure is N4 in FIG. 3, N3 is a newly added parent node. For example, a default value of a current temporary ETX at any network node in the wireless mesh network is set to a product of R and a half of a maximum quantity of network-supported hops, and the maximum quantity of network-supported hops is 8. In addition, it is assumed that N4 can obtain an identifier of N3, a quantity of subnodes already connected to N3, and a rank of N3, an identifier of N2, a quantity of subnodes already connected to N2, and a rank of N2, an identifier of N1, a quantity of subnodes already connected to N1, and a rank of N1. A result is shown in Table 1.

TABLE 1

| Identifier of a parent node | Quantity of subnodes already connected to the parent node | Rank of the parent node |
| --- | --- | --- |
| N1 | 6 | 3R |
| N2 | 4 | 3R |
| N3 | 0 | 3R |

It should be noted that the rank of N3 in Table 1 is based on an assumption that after N3 is added, an ETX_S of N3 continuously converges to 3R according to a formula ETX_S=ETX_Old*90%+ETX_New*10%, for example:

First time: If ETX_New=3R, $ETX\_S=ETX\_Old*90\%+ETX\_New*10\%=4R*90\%+3R*10\%=3.9;$ Second time: If ETX_New=2R, $ETX\_S=ETX\_Old*90\%+ETX\_New*10\%=3.9*90\%+2R*10\%=3.71;$ Third time: If ETX_New=3R, $ETX\_S=ETX\_Old*90\%+ETX\_New*10\%=3.71*90\%+3R*10\%=3.639;$ and so on. The ETX_S converges gradually, and finally converges to 3R.

It should be noted that N3 herein is a first-hop subnode, and therefore the rank of N3 is actually equivalent to the ETX_S of N3. Certainly, if N3 is not a first-hop subnode, for a specific manner of calculating the rank of N3, refer to the background, and details are not described herein again.

In addition, it assumed that an ETX_S of N4 corresponding to N1, N2, and N3 is shown in Table 2.

TABLE 2

| Identifier of a candidate parent node | ETX_S of N4 |
| --- | --- |
| N1 | 2.5R |
| N2 | 2R |
| N3 | 4R |

It can be learned according to a formula RANK=ETX_S+ETX_F and with reference to Table 1 and Table 2 that candidate ranks of N4 corresponding to N1, N2, and N3 are shown in Table 3.

TABLE 3

| Identifier of a parent node | Candidate rank of N4 |
| --- | --- |
| N1 | 5.5R |
| N2 | 5R |
| N3 | 7R |

First, N4 determines a first candidate parent node set based on Table 3 and according to a first preset rule. The first preset rule is that the first candidate parent node set includes a first candidate parent node and a candidate parent node with same communication quality as the first candidate parent node, the first candidate parent node is one of the candidate parent nodes N1, N2 and N3, and a candidate rank of N4 corresponding to the first candidate parent node is smallest. It can be learned from Table 3 that a candidate rank of N4 corresponding to N2 is smallest. Therefore, the first candidate parent node is N2.

Herein, it is assumed that the candidate parent node with same communication quality as the first candidate parent node is a candidate parent node corresponding to the candidate rank of N4 with a difference from a target rank being not greater than R, and the target rank is a candidate rank of N4 corresponding to N2, that is, 5R. It can be learned based on Table 3 that a difference between 5.5R and 5R is not greater than R. Therefore, a parent node with same communication quality as N2 is N1, and the first candidate parent node set is {N2, N1}.

Then N4 determines, based on a quantity of subnodes already connected to each candidate parent node in the first candidate parent node set, a candidate parent node that is in the first candidate parent node set and that is already connected to a smallest quantity of subnodes as a target parent node of N4.

It can be learned based on Table 1 that a quantity of subnodes already connected to N2 is 4, and a quantity of subnodes already connected to N1 is 6. Therefore, N4 uses N2 as the target parent node. The result is still shown in FIG. 3, and no switching occurs.

On another hand, it is assumed that the ETX_S of N4 continuously converges according to the formula ETX_S=ETX_Old*90%+ETX_New*10%. For example, based on an example of convergence of an ETX_S of N3, when N3 is used as the target parent node of N4, the ETX_S of N4 converges to 3R, and according to the rank calculation manner in the background, a candidate rank of N4 corresponding to N3 can be obtained RANK=ETX_S+ETX_F=3R+3R=6R. In this case, the first candidate parent node set is {N2, N1, N3}. Further, when N4 determines the target parent node of N4 based on a quantity of subnodes already connected to each candidate parent node in the first candidate parent node set, N4 can determine N3 as the target parent node. That is, with continuous update of the wireless mesh network, a newly added node may be likely to be selected as a target parent node. This is different from the other approaches in which there may be a thundering herd effect or frequent switching when a new node is added.

Figure 7:
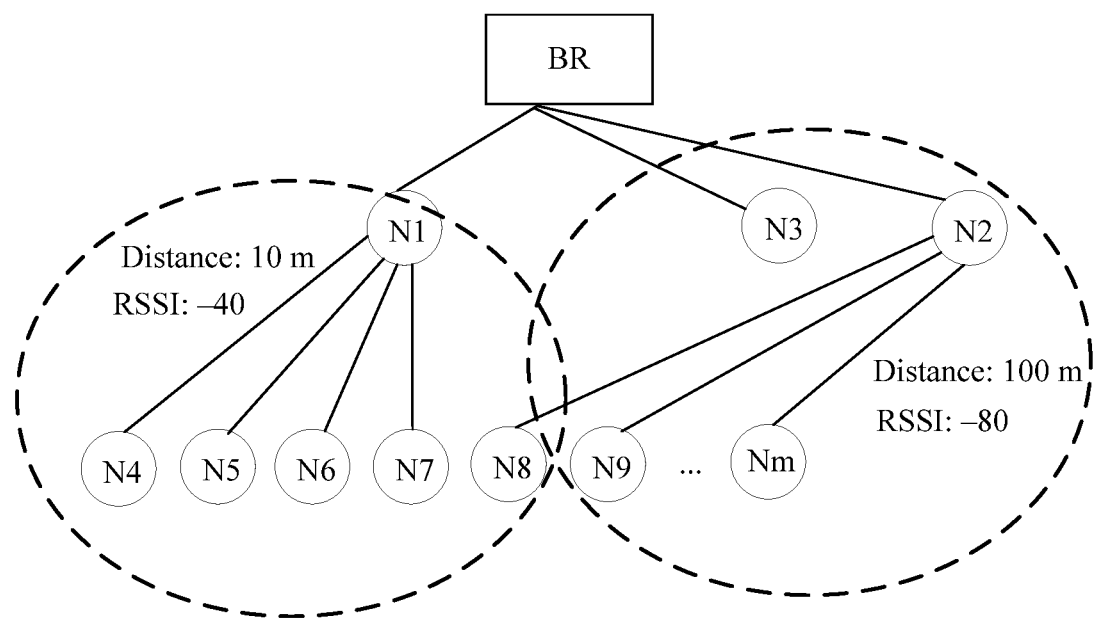
FIG. 7 is a schematic diagram 1 of a network topology of a balanced wireless mesh network according to an embodiment of the present disclosure.

Further, it is assumed that FIG. 7 is a balanced wireless mesh network obtained after a parent node is selected according to the foregoing parent node selection method. Because a quantity of subnodes already connected to the parent node is considered, a network node N8 that should select N1 on the left as the parent node finally selects N2 that is 100 meters (m) away on the right as the parent node. In this case, the network is not an optimal balanced network either, and worse network communication quality may be caused.

Figure 8:
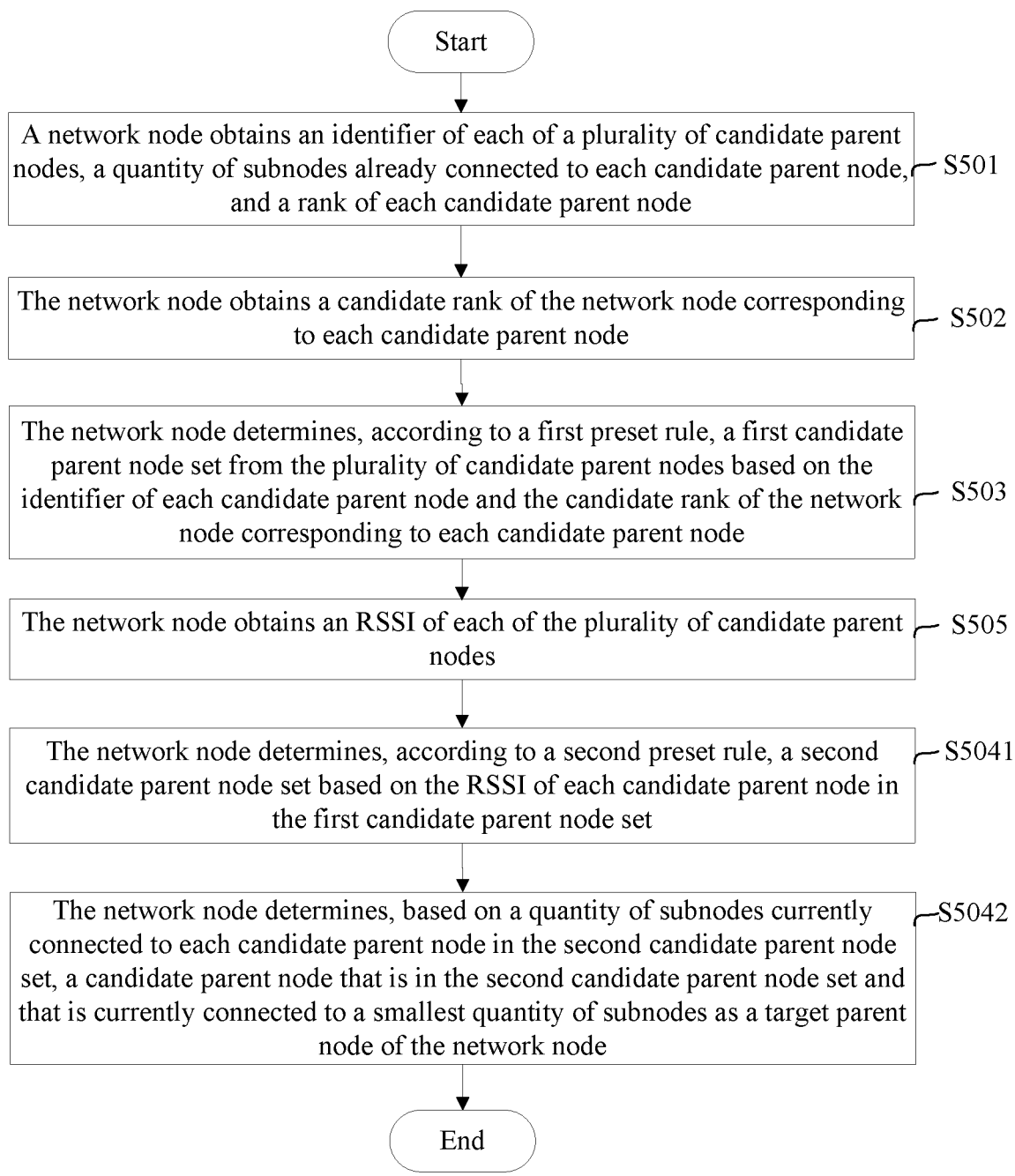
FIG. 8 is a schematic flowchart 2 of a parent node selection method according to an embodiment of the present disclosure.

Based on this, as shown in FIG. 8, the parent node selection method in this embodiment of the present disclosure may further include step S505.

Step S505: The network node obtains an RSSI of each of the plurality of candidate parent nodes.

Figures 9, 10:
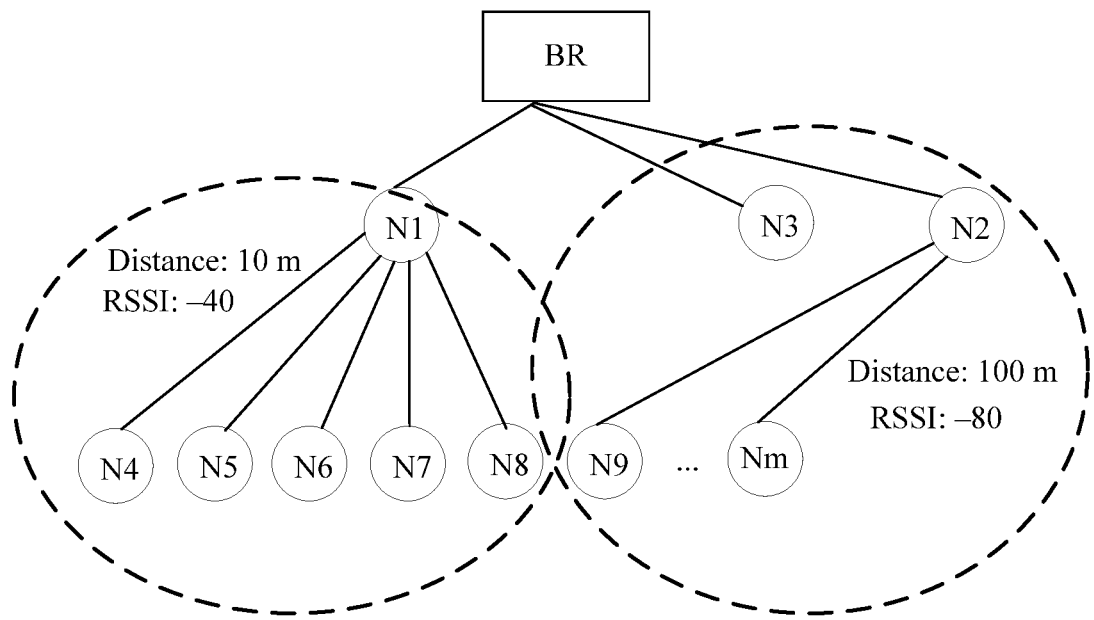
FIG. 9 is a schematic diagram 2 of a format of an RPL DIO packet according to an embodiment of the present disclosure.
FIG. 10 is a schematic diagram 2 of a network topology of a balanced wireless mesh network according to an embodiment of the present disclosure.

The RSSI of each candidate parent node may be carried in the RPL DIO packet. As shown in FIG. 9, an RSSI field is added to the RPL DIO packet, and the RSSI field is used to represent the RSSI of each candidate parent node. Certainly, the network node may alternatively obtain the RSSI of each candidate parent node in another manner. This is not further limited in this embodiment of the present disclosure.

It should be noted that in the other approaches, RPL DIO packet does not include an RSSI field. That is, the RSSI field is a newly added field in the RPL DIO packet provided in this embodiment of the present disclosure compared with the other approaches RPL DIO packet. Description is provided herein, and details are not described in the following again.

It should be noted that in this embodiment of the present disclosure, there is no necessary execution sequence between steps S501 to S503 and step S505. Steps S501 to S503 may be performed before step S505, step S505 may be performed before steps S501 to S503, and steps S501 to S503 and step S505 may be performed at the same time. This is not limited in this embodiment of the present disclosure.

Step S504 may further include the following steps.

Step S5041: The network node determines, according to a second preset rule, a second candidate parent node set based on the RSSI of each candidate parent node in the first candidate parent node set.

The second preset rule is that the second candidate parent node set includes a second candidate parent node and a candidate parent node with same signal strength as the second candidate parent node, and the second candidate parent node is a candidate parent node with a largest RSSI in the first candidate parent node set.

Optionally, in this embodiment of the present disclosure, the candidate parent node with same signal strength as the second candidate parent node may include a candidate parent node whose RSSI is different from an RSSI of the candidate parent node with a largest RSSI by less than a second threshold.

The second threshold may be an empirical value, or may be a value obtained from a plurality of experiments. This is not limited in this embodiment of the present disclosure. For example, the second threshold may be 20 decibels (dB).

Optionally, a candidate parent node in the second candidate parent node set is usually a candidate parent node whose RSSI is greater than a first threshold, where the first threshold is not less than a minimum RSSI meeting a communication requirement. For example, at present, a minimum RSSI meeting a communication requirement is −85. Therefore, the first threshold may be −85 dB. This can ensure that the target parent node of the network node is a node that normally performs communication.

Step S5042: The network node determines, based on a quantity of subnodes already connected to each candidate parent node in the second candidate parent node set, a candidate parent node that is in the second candidate parent node set and that is already connected to a smallest quantity of subnodes as the target parent node of the network node.

For example, it is assumed that the network node in this embodiment of the present disclosure is N8 in FIG. 7, the first threshold is −85 dB, and the second threshold is 20 dB. In addition, it is assumed that N8 can obtain an identifier of N3, a quantity of subnodes already connected to N3, an RSSI of N3, and a candidate rank of N8 corresponding to N3, an identifier of N2, a quantity of subnodes already connected to N2, an RSSI of N2, and a candidate rank of N8 corresponding to N2, and an identifier of N1, a quantity of subnodes already connected to N1, an RSSI of N1, and a candidate rank of N8 corresponding to N1. A result is shown in Table 4.

TABLE 4

| Identifier of a parent node | Quantity of subnodes already connected to the parent node | Candidate rank of N8 | RSSI of the parent node |
| --- | --- | --- | --- |
| N1 | 6 | 5R | −40 |
| N2 | 4 | 4.5R | −80 |
| N3 | 0 | 6R | −80 |

First, N8 determines a first candidate parent node set based on candidate ranks of N8 corresponding to N1, N2, and N3 in Table 4 and according to the first preset rule. The first preset rule is that the first candidate parent node set includes a first candidate parent node and a candidate parent node with same communication quality as the first candidate parent node, the first candidate parent node is one of the candidate parent nodes N1, N2 and N3, and a candidate rank of N8 corresponding to the first candidate parent node is smallest. It can be learned from Table 4 that a candidate rank of N8 corresponding to N2 is smallest. Therefore, the first candidate parent node is N2.

Herein, it is assumed that the candidate parent node with same communication quality as the first candidate parent node is a candidate parent node corresponding to the candidate rank of N8 with a difference from a target rank being not greater than R, and the target rank is a candidate rank of N8 corresponding to N2, that is, 5R. It can be learned based on Table 4 that a difference between 5R and 4.5R is not greater than R. Therefore, a parent node with same communication quality as N2 is N1, and the first candidate parent node set is {N2, N1}.

Then N8 determines a second candidate parent node set based on RSSIs of N1 and N2 and according to a second preset rule. The second preset rule is that the second candidate parent node set includes a second candidate parent node and a candidate parent node with same signal strength as the second candidate parent node, and the second candidate parent node is a candidate parent node with a largest RSSI in the first candidate parent node set. It can be learned from Table 4 that the candidate parent node with a largest RSSI in the first candidate parent node set {N2, N1} is N1, that is, the second candidate parent node is N1.

Herein, it is assumed that the candidate parent node with same signal strength as the second candidate parent node may include a candidate parent node whose RSSI is different from an RSSI of the candidate parent node with a largest RSSI by less than 20 dB. It can be learned from Table 4 that a parent node with same signal strength as N1 does not exist. Therefore, the second candidate parent node set is {N1}.

Finally, N8 determines, based on a quantity of subnodes already connected to each candidate parent node in the second candidate parent node set, a candidate parent node that is in the second candidate parent node set and that is already connected to a smallest quantity of subnodes as the target parent node of N8.

Because the second candidate parent node set only includes N1 in this case, N8 uses N1 as the target parent node. A result is shown in FIG. 10.

Based on the parent node selection method provided in this embodiment of the present disclosure, in this embodiment of the present disclosure, the rank of each candidate parent node is obtained by the candidate parent node based on that the default value of the current temporary ETX at each candidate parent node is greater than R, and the current actual ETX at the network node is obtained by the network node based on that the default value of the current temporary ETX at the network node is greater than R, where R represents the preset path coefficient. In addition, the network node first determines the first candidate parent node set from the plurality of candidate parent nodes based on the candidate rank of the network node corresponding to each candidate parent node, then determines the second candidate parent node set from the first candidate parent node set based on the RSSI of the candidate parent node, and finally selects the target parent node from the second candidate parent node set based on the quantity of subnodes already connected to the candidate parent node. On one hand, when determining the first candidate parent node set, a smaller rank indicates better communication quality. Therefore, the first candidate parent node set includes the first candidate parent node, the first candidate parent node is one of the plurality of candidate parent nodes, and the candidate rank of the network node corresponding to the first candidate parent node is smallest. In addition, when selecting a parent node, the network node is not expected to perform switching back and forth between parent nodes with same communication quality. Therefore, the first candidate parent node set further includes the parent node with the same communication quality as the first candidate parent node such that the network node can select the target parent node from the first candidate parent node set. In addition, because default values of current temporary ETXs at each candidate parent node and the network node in the mesh network are both greater than R, when a candidate parent node is a newly added node, by properly setting the default values of the current temporary ETXs, the candidate parent node is usually not included in the first candidate parent node set, and therefore will not become the target parent node of the network node. This can avoid a thundering herd effect of 6LoWPAN. On the other hand, when selecting the target parent node from the second candidate parent node set, the candidate parent node that is in the second candidate parent node set and that is already connected to a smallest quantity of subnodes is determined as the target parent node of the network node, and the second candidate parent node set includes a candidate parent node with a relatively good RSSI in the first candidate parent node set. That is, balance factors of a 6LoWPAN wireless mesh network are further fully considered, and not only a possibility that parent node aging and parent node switching are easily caused because the parent node is connected to an excessively large quantity of network nodes is reduced, but also communication quality of the wireless mesh network is not reduced. In this case, the 6LoWPAN can rapidly and stably form a more balanced wireless mesh network. This is further helpful for improving networking efficiency and communication stability of the 6LoWPAN wireless mesh network, and further increases an access capacity of the wireless mesh network.

Further, after the network node joins the wireless mesh network successfully based on the selected target parent node, the network node may be further likely to become a parent node of a lower-level node. Therefore, the parent node selection method provided in this embodiment of the present disclosure may further include sending, by the network node, an RPL DIO packet from the network node to a candidate subnode of the network node, where the RPL DIO packet from the network node includes an identifier of the network node, a quantity of subnodes already connected to the network node, and a rank of the network node. Optionally, the RPL DIO packet from the network node may further include an RSSI of the network node. In this way, after receiving the RPL DIO packet sent by the network node, the candidate subnode of the network node can select a parent node according to the parent node selection method provided in the embodiment shown in FIG. 5 or FIG. 6. This is not limited in this embodiment of the present disclosure.

For related descriptions about the RPL DIO packet, refer to the foregoing method embodiments, and details are not described herein again.

The foregoing mainly describes, from a perspective of interaction between network elements, the solutions provided in the embodiments of the present disclosure. It may be understood that, to implement the foregoing functions, the network node includes a corresponding hardware structure and/or software module for performing each of the functions. A person skilled in the art should be easily aware that, units and algorithm steps of each example described with reference to the embodiments disclosed in the specification may be implemented by hardware, or a combination of hardware and computer software in this application. Whether a function is performed by hardware or computer software driving hardware depends on particular applications and design constraints of the technical solutions. A person skilled in the art may use different methods to implement the described functions for each particular application, but it should not be considered that the implementation goes beyond the scope of this application.

In the embodiments of the present disclosure, the network node may be divided into function modules according to the foregoing method example. For example, the function modules may be obtained through division corresponding to functions, or two or more functions are integrated into one processing module. The integrated module may be implemented in a form of hardware, or may be implemented in a form of a software function module. It should be noted that module division in the embodiments of the present disclosure is an example and is merely logical function division, and may be other division in actual implementation.

Figure 11:
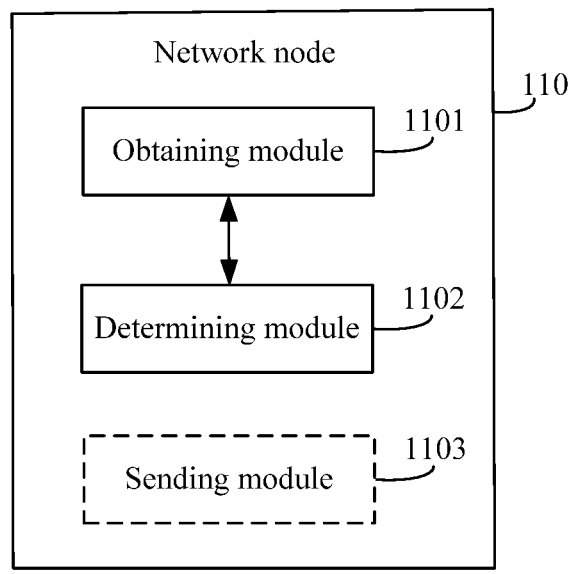
FIG. 11 is a schematic structural diagram 1 of a network node according to an embodiment of the present disclosure.

For example, when various function modules are obtained through division according to corresponding functions, FIG. 11 shows a possible schematic structural diagram of a network node 110 in the foregoing embodiments. As shown in FIG. 11, the network node 110 includes an obtaining module 1101 and a determining module 1102. The obtaining unit 1101 is configured to support the network node 110 in performing steps S501 and S502 in FIG. 5, and the determining module 1102 is configured to support the network node 110 in performing steps S503 and S504 in FIG. 5. Alternatively, optionally, the obtaining module 1101 is configured to support the network node 110 in performing steps S501, S502, and S505 in FIG. 6, and the determining module 1102 is configured to support the network node 110 in performing steps S503, S5041, and S5042 in FIG. 6. Alternatively, optionally, as shown in FIG. 11, the network node 110 further includes a sending module 1103. The sending module 1103 is configured to send an RPL DIO packet from the network node 110 to a candidate subnode of the network node 110, where the RPL DIO packet from the network node 110 includes an identifier of the network node 110, a quantity of subnodes already connected to the network node 110, and a rank of the network node 110. Optionally, the RPL DIO packet from the network node 110 may further include an RSSI of the network node 110.

All related content of all steps in the method embodiments may be cited in function descriptions of corresponding function modules, and details are not described herein again.

Figure 12:
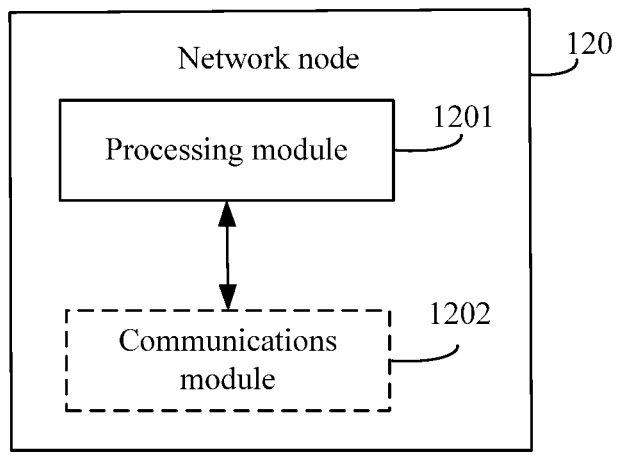
FIG. 12 is a schematic structural diagram 2 of a network node according to an embodiment of the present disclosure.

When various function modules are obtained through division in an integrated manner, FIG. 12 shows a possible schematic structural diagram of a network node 120 in the foregoing embodiments. As shown in FIG. 12, the network node 120 includes a processing module 1201. The processing module 1201 is configured to support the network node 120 in performing steps S501, S502, S503, and S504 in FIG. 5. Alternatively, optionally, the processing module 1201 is configured to support the network node 120 in performing steps S501, S502, S503, S5041, S5042, and S505 in FIG. 6. Alternatively, optionally, as shown in FIG. 12, the network node 120 further includes a communications module 1202. The communications module 1202 is configured to send an RPL DIO packet from the network node 120 to a candidate subnode of the network node 120, where the RPL DIO packet from the network node 120 includes an identifier of the network node 120, a quantity of subnodes already connected to the network node 120, and a rank of the network node 120. Optionally, the RPL DIO packet from the network node 120 may further include an RSSI of the network node 120.

All related content of all steps in the method embodiments may be cited in function descriptions of corresponding function modules, and details are not described herein again.

In this embodiment of the present disclosure, the network node is presented in a form in which function modules are obtained through division according to corresponding functions, or the network node is presented in a form in which function modules are obtained through division in an integrated manner. Herein, the "module" may be a particular application-specific integrated circuit (ASIC), a circuit, a processor that executes one or more software or firmware programs and a memory, an integrated logical circuit, and/or another component that can provide the foregoing functions. In a simple embodiment, a person skilled in the art may figure out that the form shown in FIG. 4 may be used for the network node 110 or the network node 120.

Figure 4:
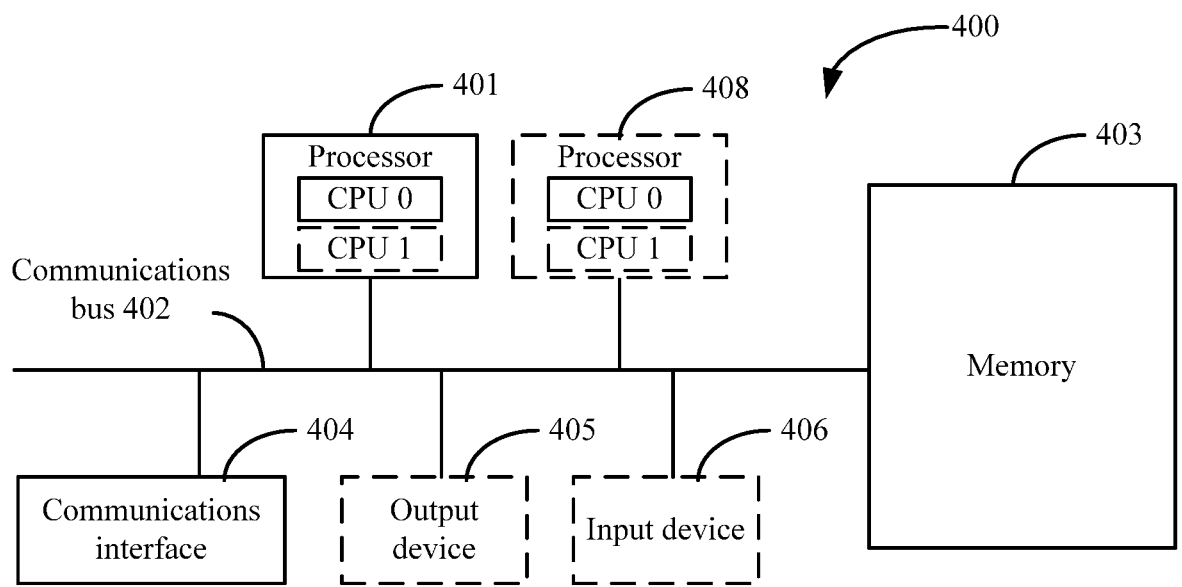
FIG. 4 is a schematic structural diagram of hardware of a network node according to an embodiment of the present disclosure.

FIG. 4 is a schematic structural diagram of hardware of a network node 400 according to an embodiment of the present disclosure. The network node 400 includes a processor 401, a communications bus 402, and a communications interface 404.

The processor 401 may be a general purpose processor, for example, a central processing unit (CPU), a network processor (NP), or a combination of a CPU and an NP. Alternatively, the processor 401 may be a microprocessor (MCU), an ASIC, a programmable logic device (PLD), or a combination thereof. The PLD may be a complex PLD (CPLD), a field-programmable gate array (FPGA), a generic array logic (GAL), or any combination thereof. For example, in this embodiment of the present disclosure, the processor 401 may be a STM32F405 chip, and used for running and encryption/decryption of the 6LoWPAN protocol.

The communications bus 402 may include a channel and transfers information between the foregoing components.

The communications interface 404 is configured to communicate, using any apparatus such as a transceiver, with another device or a communications network, and may include an Ethernet interface, a radio access network (RAN) interface, a wireless local area network (WLAN) interface, and the like.

Optionally, the network device 400 may further include a memory 403. The memory 403 may include a volatile memory, such as a random access memory (RAM), or the memory 403 may include a non-volatile memory, such as a flash memory, a hard disk drive (HDD), or a solid-state drive (SSD), or the memory 403 may include a combination of the foregoing types of memories.

Optionally, the memory 403 is configured to store program code. The processor 401 is configured to execute the program code stored in the memory 403 in order to implement the parent node selection method provided in the embodiments of the present disclosure.

In specific implementation, the processor 401 may include one or more CPUs, for example, a CPU 0 and a CPU 1 in FIG. 4. The CPU may be a single-core CPU or a multi-core CPU.

In specific implementation, in an embodiment, the network node 400 may further include an output device 405 and an input device 406. The output device 405 communicates with the processor 401, and may display information in a plurality of manners. For example, the output device 405 may be a liquid crystal display (LCD), a light emitting diode (LED) display device, a cathode ray tube (CRT) display device, or a projector. The input device 406 communicates with the processor 401, and may receive a user input in a plurality of manners. For example, the input device 406 may be a mouse, a keyboard, a touchscreen device, or a sensor device.

The network node 400 may be a general node or a dedicated node. In specific implementation, the network node 400 may be a desktop computer, a portable computer, a network server, a palmtop computer (Personal Digital Assistant (PDA)), a mobile phone, a tablet computer, a wireless terminal device, an embedded device, or a device of a structure similar to that in FIG. 4. A type of the network node 400 is not limited in this embodiment of the present disclosure.

For example, the obtaining module 1101, the determining module 1102, and the sending module 1103 in FIG. 11 may be implemented by the processor 401 and the memory 403 in FIG. 4. Further, the obtaining module 1101, the determining module 1102, and the sending module 1103 may be implemented by invoking, by the processor 401, the application program code stored in the memory 403. This is not limited in this embodiment of this application. Alternatively, for example, the processing module 1201 and the communications module 1202 in FIG. 12 may be implemented by the processor 401 and the memory 403 in FIG. 4. Further, the processing module 1201 and the communications module 1202 may be implemented by invoking, by the processor 401, the application program code stored in the memory 403. This is not limited in this embodiment of this application.

The network node provided in this embodiment of the present disclosure may be configured to perform the foregoing parent node selection method. Therefore, for technical effects that can be obtained by the network node, refer to the foregoing method embodiments. Details are not described herein again in this embodiment of the present disclosure.

All or some of the foregoing embodiments may be implemented using software, hardware, firmware, or any combination thereof. When a software program is used to implement the embodiments, the embodiments may be implemented completely or partially in a form of a computer program product. The computer program product includes one or more computer instructions. When the computer program instructions are loaded and executed on the computer, the procedure or functions according to the embodiments of the present disclosure are all or partially generated. The computer may be a general-purpose computer, a dedicated computer, a computer network, or other programmable apparatuses. The computer instructions may be stored in a computer-readable storage medium or may be transmitted from a computer-readable storage medium to another computer-readable storage medium. For example, the computer instructions may be transmitted from a website, computer, server, or data center to another website, computer, server, or data center in a wired (for example, a coaxial cable, an optical fiber, or a digital subscriber line (DSL)) or wireless (for example, infrared, radio, and microwave) manner. The computer-readable storage medium may be any usable medium accessible by a computer, or a data storage device, such as a server or a data center, integrating one or more usable media. The usable medium may be a magnetic medium (for example, a FLOPPY DISK, a hard disk, or a magnetic tape), an optical medium (for example, a digital versatile disc (DVD)), a semiconductor medium (for example, an SSD), or the like.

Although this application is described with reference to the embodiments, in a process of implementing this application that claims protection, a person skilled in the art may understand and implement another variation of the disclosed embodiments by viewing the accompanying drawings, disclosed content, and the accompanying claims. In the claims, the term "comprising" does not exclude another component or another step, and "a" or "one" does not exclude a meaning of plurality. A single processor or another unit may implement several functions enumerated in the claims. Some measures are recorded in dependent claims that are different from each other, but this does not mean that these measures cannot be combined to produce a better effect.

Although this application is described with reference to specific features and the embodiments thereof, obviously, various modifications and combinations may be made to them without departing from the spirit and scope of this application. Correspondingly, the specification and accompanying drawings are merely example description of this application defined by the accompanying claims, and is considered as any of or all modifications, variations, combinations or equivalents that cover the scope of this application. Obviously, a person skilled in the art can make various modifications and variations to this application without departing from the scope of this application. This application is intended to cover these modifications and variations of this application provided that they fall within the scope of protection defined by the following claims and their equivalent technologies.

What is claimed is:

1. A parent node selection method applied to a wireless mesh network and implemented by a network node, wherein the parent node selection method comprises:
   obtaining an identifier of each of a plurality of first candidate parent nodes, a quantity of subnodes currently coupled to each of the first candidate parent nodes, and a rank of each of the first candidate parent nodes, wherein a rank of a corresponding candidate parent node of the first candidate parent nodes is a total transmission path from the corresponding candidate parent node to a border router (BR) of the wireless mesh network wherein the rank of the corresponding candidate parent node is based on a first default value of a first current temporary expected transmission count (ETX) at the corresponding candidate parent node, and wherein the first default value is greater than a preset path coefficient (R);
   obtaining a current actual ETX at the network node that is based on a second default value of a second current temporary ETX at the network node, wherein the second default value is for the network node, and wherein the second default value is greater than the R;
   obtaining a first candidate rank of the network node, wherein a candidate rank of the network node corresponds to a candidate parent node of the first candidate parent nodes and is a total transmission path from the network node to the BR through the candidate parent node, wherein the first candidate rank is based on a rank of the candidate parent node and the current actual ETX at the network node;
   determining, according to a first preset rule, a first candidate parent node set from the first candidate parent nodes based on the identifier and the first candidate rank of the network node that corresponds to each of the first candidate parent nodes, wherein the first candidate parent node set comprises a plurality of second candidate parent nodes, wherein the first preset rule indicates that the first candidate parent node set comprises a first candidate parent node and a second candidate parent node with a same communication quality as the first candidate parent node, wherein the first candidate parent node is one of the first candidate parent nodes, and wherein a candidate rank of the network node that corresponds to the first candidate parent node is a smallest candidate rank; and
   determining, based on a quantity of subnodes currently coupled to each of the second candidate parent nodes, a third candidate parent node from the first candidate parent node set and that is currently coupled to a smallest quantity of subnodes as a target parent node of the network node.

2. The parent node selection method of claim 1, wherein the second candidate parent node comprises a candidate rank comprising a difference from a target rank that is less than the R, and wherein the target rank corresponds to the first candidate parent node.

3. The parent node selection method of claim 1, wherein the second candidate parent node comprises a second candidate rank of the network node comprising a difference from a target rank that is equal to the R, and wherein the target rank corresponds to the first candidate parent node.

4. The parent node selection method of claim 1, further comprising obtaining a received signal strength indicator (RSSI) of each of the first candidate parent nodes, and wherein determining the third candidate parent node comprises:
   determining, according to a second preset rule, a second candidate parent node set based on the RSSI of each of the first candidate parent nodes in the first candidate parent node set, wherein the second preset rule indicates that the second candidate parent node set comprises a fourth candidate parent node comprising a same signal strength as a fifth candidate parent node, and wherein the fourth candidate parent node comprises a largest RSSI in the first candidate parent node set; and
   determining, based on a quantity of subnodes currently coupled to each of a plurality of third candidate parent nodes in the second candidate parent node set, a sixth candidate parent node in the second candidate parent node set and that is currently coupled to the smallest quantity of subnodes as the target parent node of the network node.

5. The parent node selection method of claim 4, wherein the fifth candidate parent node with the same signal strength as the fourth candidate parent node comprises an RSSI that is different from an RSSI of the fourth candidate parent node with a largest RSSI by less than a second threshold.

6. The parent node selection method of claim 1, wherein obtaining the identifier of each of the first candidate parent nodes, the quantity of subnodes currently coupled to each of the first candidate parent nodes, and the rank of each of the first candidate parent nodes comprises receiving an Internet Protocol version 6 Routing Protocol for Low-Power and Lossy Networks (RPL) destination-oriented directed acyclic graph information object (DIO) packet from each of the first candidate parent nodes, and wherein an RPL DIO packet received from the corresponding candidate parent node comprises an identifier of the corresponding candidate parent node, a quantity of subnodes currently coupled to the corresponding candidate parent node, and a rank of the corresponding candidate parent node.

7. The parent node selection method of claim 1, further comprising sending an Internet Protocol version 6 Routing Protocol for Low-Power and Lossy Networks (RPL) destination-oriented directed acyclic graph information object (DIO) packet to a candidate subnode of the network node, wherein the Internet Protocol version 6 RPL DIO packet comprises an identifier of the network node, a quantity of subnodes currently coupled to the network node, and a rank of the network node.

8. The parent node selection method of claim 1, wherein the second default value being greater than the R indicates that the second default value is a product of the R and a half of a maximum quantity of network-supported hops, and wherein the maximum quantity of network-supported hops is greater than two.

9. A network node, applied to a wireless mesh network, comprising:
   a memory configured to store a computer program instruction; and
   a processor coupled to the memory and configured to execute the computer program instruction, wherein the computer program instruction causes the processor to:
      obtain an identifier of each of a plurality of first candidate parent nodes, a quantity of subnodes currently coupled to each of the first candidate parent nodes, and a rank of each of the first candidate parent nodes, wherein a rank of a corresponding candidate parent node is a total transmission path from the corresponding candidate parent node to a border router (BR) of the wireless mesh network, wherein a rank of the corresponding candidate parent node is based on a first default value of a first current temporary expected transmission count (ETX) at the corresponding candidate parent node, and wherein the first default value o is greater than a preset path coefficient (R);
      obtain a current actual ETX at the network node that is based on a second default value of a second current temporary ETX at the network node, wherein the second default value is for the network node, and wherein the second default value of the current temporary ETX at the network node is greater than the R;
      obtain a first candidate rank of the network node, wherein a candidate rank of the network node corresponds to a candidate parent node of the first candidate parent nodes and is a total transmission path from the network node to the BR through the candidate parent node, wherein the first candidate rank is based on a rank of the candidate parent node and the current actual ETX at the network node;
      determine, according to a first preset rule, a first candidate parent node set from the first candidate parent nodes based on the identifier and the first candidate rank of the network node that corresponds to each of the first candidate parent nodes, wherein the first candidate parent node set comprises a plurality of second candidate parent nodes, wherein the first preset rule indicates that the first candidate parent node set comprises a first candidate parent node and a second candidate parent node with a same communication quality as the first candidate parent node, wherein the first candidate parent node is one of the first candidate parent nodes, and wherein a candidate rank of the network node that corresponds to the first candidate parent node is a smallest candidate rank; and
      set, based on a quantity of subnodes currently coupled to each of the second candidate parent nodes, a third candidate parent node from the first candidate parent node set and that is currently coupled to a smallest quantity of subnodes as a target parent node of the network node.

10. The network node of claim 9, wherein the computer program instruction stored in the memory further causes the processor to be configured to:
   obtain a received signal strength indicator (RSSI) of each of the first candidate parent nodes;
   determine, according to a second preset rule, a second candidate parent node set based on the RSSI of each of the first candidate parent nodes in the first candidate parent node set, wherein the second preset rule indicates that the second candidate parent node set comprises a fourth candidate parent node comprising a same signal strength as a fifth candidate parent node, and wherein the fourth candidate parent node comprises a largest RSSI in the first candidate parent node set; and
   determine, based on a quantity of subnodes currently coupled to each of a plurality of third candidate parent nodes in the second candidate parent node set, a sixth candidate parent node in the second candidate parent node set and that is currently coupled to the smallest quantity of subnodes as the target parent node of the network node.

11. The network node of claim 10, wherein the second candidate parent node comprises a candidate rank comprising a difference from a target rank that is less than the R, wherein the target rank corresponds to the first candidate parent node, and wherein the fifth candidate parent node with the same signal strength as the fourth candidate parent node comprises an RSSI that is different from an RSSI of the fourth candidate parent node with a largest RSSI by less than a second threshold.

12. The network node of claim 10, wherein the second candidate parent node comprises a candidate rank comprising a difference from a target rank that is equal to the R, wherein the target rank corresponds to the first candidate parent node, and wherein the fifth candidate parent node with the same signal strength as the fourth candidate parent node comprises an RSSI that is different from an RSSI of the fourth candidate parent node with a largest RSSI by less than a second threshold.

13. The network node of claim 9, wherein the computer program instruction stored in the memory further causes the processor to be configured to receive an Internet Protocol version 6 Routing Protocol for Low-Power and Lossy Networks (RPL) destination-oriented directed acyclic graph information object (DIO) packet from each of the first candidate parent nodes, and wherein an Internet Protocol version 6 RPL DIO packet received from the corresponding candidate parent node comprises each of an identifier of the corresponding candidate parent node, a quantity of subnodes currently coupled to the corresponding candidate parent node, and a rank of the corresponding candidate parent node.

14. The network node of claim 9, wherein the computer program instruction stored in the memory further causes the processor to be configured to send an Internet Protocol version 6 Routing Protocol for Low-Power and Lossy Networks (RPL) destination-oriented directed acyclic graph information object (DIO) packet to a candidate subnode of the network node, and wherein the Internet Protocol version 6 RPL DIO packet comprises each of an identifier of the network node, a quantity of subnodes currently coupled to the network node, and a rank of the network node.

15. The network node of claim 9, wherein the second default value being greater than the R indicates that the second default value is a product of the R and a half of a maximum quantity of network-supported hops, and wherein the maximum quantity of network-supported hops is greater than two.

16. A parent node selection system, applied to a wireless mesh network, wherein the parent node selection system comprises:
   a network node; and
   a plurality of first candidate parent nodes coupled to the network node, wherein each of the first candidate parent nodes is configured to send, to the network node, an Internet Protocol version 6 Routing Protocol for Low-Power and Lossy Networks (RPL) destination-oriented directed acyclic graph (DODAG) information object (DIO) packet, wherein an Internet Protocol version 6 RPL DIO packet of a corresponding candidate parent node comprises each of an identifier of the corresponding candidate parent node, a quantity of subnodes currently coupled to the corresponding candidate parent node, and a rank of the corresponding candidate parent node, wherein the rank of the corresponding candidate parent node is a total transmission path from the corresponding candidate parent node to a border router (BR) of the wireless mesh network, wherein the rank of the corresponding candidate parent node is based on a first default value of a current temporary expected transmission count (ETX) at the corresponding candidate parent node, wherein the first default value is greater than a preset path coefficient (R), wherein the network node is configured to:

receive the Internet Protocol version 6 RPL DIO packet from each of the first candidate parent nodes;

obtain an identifier of each of the first candidate parent nodes, a quantity of subnodes currently coupled to each of the first candidate parent nodes, and a rank of each of the first candidate parent nodes;

obtain a current actual ETX at the network node based on a second default value of a second current temporary ETX at the network node, wherein the second default value is greater than the R; and obtain a first candidate rank of the network node corresponding to each of the first candidate parent nodes, wherein a candidate rank of the network node that corresponds to a candidate parent node of the first candidate parent nodes is a total transmission path from the network node to the BR through the candidate parent node, wherein the candidate rank is based on a rank of the candidate parent node and the current actual ETX at the network node;

determine, according to a first preset rule, a first candidate parent node set from the first candidate parent nodes based on the identifier and the first candidate rank of the network node that corresponds to each of the first candidate parent nodes, wherein the first preset rule indicates that the first candidate parent node set comprises a first candidate parent node and a second candidate parent node with a same communication quality as the first candidate parent node, wherein the first candidate parent node is one of the first candidate parent nodes, and wherein a candidate rank of the network node that corresponds to the first candidate parent node is a smallest candidate rank; and determine, based on a quantity of subnodes currently coupled to each of a plurality of second candidate parent nodes in the first candidate parent node set, a candidate parent node that is in the first candidate parent node set and that is currently coupled to a smallest quantity of subnodes as a target parent node of the network node.

17. The parent node selection system of claim 16, wherein the RPL DIO packet of the corresponding candidate parent node further comprises a received signal strength indicator (RSSI) of the corresponding candidate parent node, and wherein the network node is further configured to:

determine, according to a second preset rule, a second candidate parent node set based on an RSSI of each of the second candidate parent nodes, wherein the second preset rule indicates that the second candidate parent node set comprises a second candidate parent node and a third candidate parent node with same signal strength as the second candidate parent node, and wherein the second candidate parent node comprises a largest RSSI in the first candidate parent node set; and determine, based on a quantity of subnodes currently coupled to each of a plurality of third candidate parent nodes in the second candidate parent node set, a fourth candidate parent node in the second candidate parent node set and that is currently coupled to the smallest quantity of subnodes as the target parent node of the network node.

18. The parent node selection system of claim 17, wherein the second candidate parent node with the same communication quality as the first candidate parent node is a candidate parent node that corresponds to a candidate rank of the network node comprising a difference from a target rank being that is less than or equal to the R, wherein the target rank corresponds to the first candidate parent node, and wherein the third candidate parent node with the same signal strength as the second candidate parent node comprising an RSSI that is different from an RSSI of the second candidate parent node with a largest RSSI by less than a second threshold.

19. The parent node selection system of claim 16, further comprising a candidate subnode, wherein the network node is further configured to send an Internet Protocol version 6 RPL DIO packet from the network node to the candidate subnode of the network node, and wherein the Internet Protocol version 6 RPL DIO packet from the network node comprises each of an identifier of the network node, a quantity of subnodes currently coupled to the network node, and a rank of the network node.

20. The parent node selection system of claim 16, wherein the second default value of the second current temporary ETX at the network node being greater than the R indicates that the second default value is a product of the R and a half of a maximum quantity of network-supported hops, and wherein the maximum quantity of network-supported hops is greater than two.

* * * * *